(No Model.)

E. WILKINSON.
CLUTCH.

No. 258,968. Patented June 6, 1882.

Witnesses
Richard A. Healy
Kittie Inglis

Inventor
Edward Wilkinson
John Inglis atty (No Model.) 2 Sheets—Sheet 2.

E. WILKINSON.
CLUTCH.

No. 258,968. Patented June 6, 1882.

Witnesses
Richard A. Healy
Kittie Inglis

Inventor
Edward Wilkinson
John Inglis atty

UNITED STATES PATENT OFFICE.

EDWARD WILKINSON, OF PATERSON, NEW JERSEY.

CLUTCH.

SPECIFICATION forming part of Letters Patent No. 258,968, dated June 6, 1882.

Application filed March 24, 1882. (No model.)

*To all whom it may concern:*

Be it known that I, EDWARD WILKINSON, a citizen of the United States, residing at Paterson, Passaic county, State of New Jersey, have invented a new and useful Improvement in Clutches, of which the following is a specification, reference being had to the accompanying drawings, forming a part thereof.

The object of my invention is the production of a clutch that can be started without shock to the frame, which I accomplish by the devices and mechanism illustrated in the accompanying drawings, in which—

Figure 1:
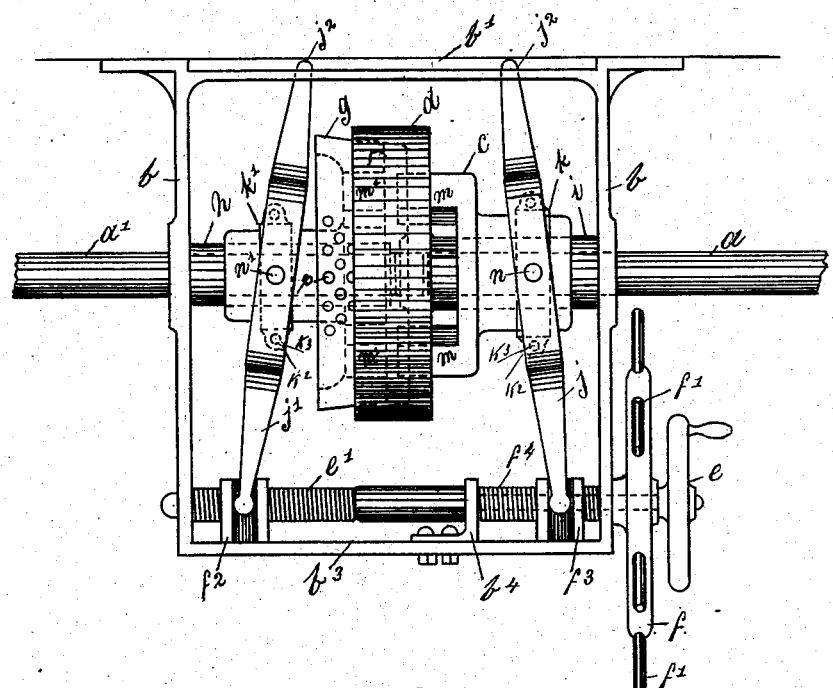
Figure 2:
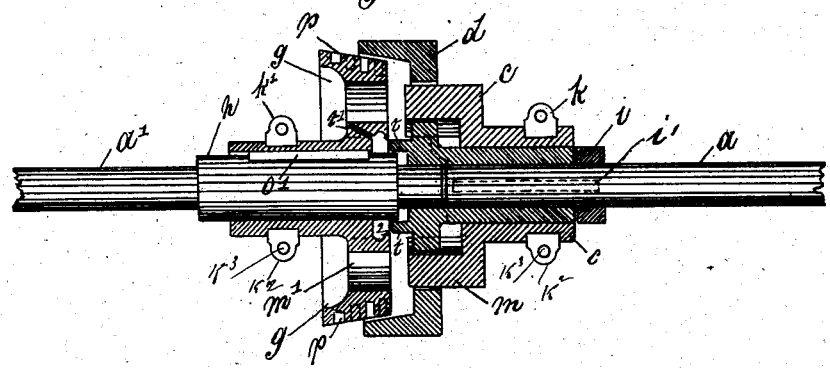
Figure 3:
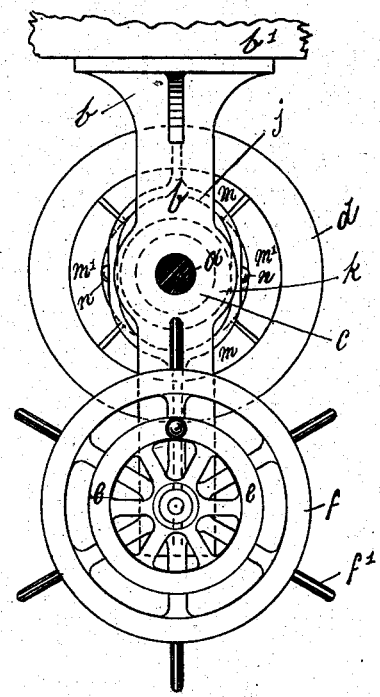
Figure 4:
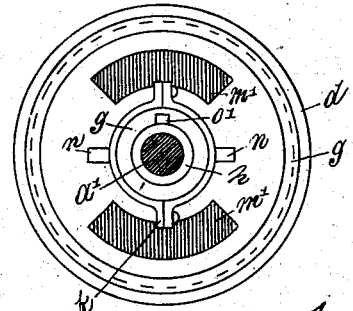

Figure 1 is a front view of my newly-invented device, showing the parts open. Fig. 2 is a section of the same. Fig. 3 is an end view showing the teeth or lugs of the sliding clutch, and recesses or openings, hand-wheels, frame, &c.; and Fig. 4 is an end view showing the friction-clutch.

$a$ represents a connected shaft, that connects with the driving-shaft $a'$. The connected shaft $a$ is provided with a key, $a^2$, by which the drum $d$ is secured to the connected shaft $a$. The driving-shaft $a'$ and connected shaft $a$ are journaled in the ends of the frame $b$.

$k\ k'$ are two collars, that are constructed in two separate parts, that are provided with lugs $k^2$ and are bolted together by bolts $k^3$. Each of the separate parts of the collars $k\ k'$ is provided with pins $n\ n'$, that are formed thereon. The pins $n\ n'$ pass through holes that are provided for them in the shifting-arms $j\ j'$, that are formed with openings in the center, that span the ends of the friction-cone $g$ and clutch $c$. One of the ends of the shifting-arms $j\ j'$ enters slots $j^2 j^2$, which are formed in the side of the frame $b'$. The other ends of the same have forks formed on them, that lie in recesses formed for them in the sliding or screw nuts $f^2 f^3$, that work on screws $e'$ and $f^4$, by the use of which screws the device is operated by means of the nuts $f^2 f^3$, the shifting-arms $j\ j'$, and hand-wheels $e$ and $f$. The screw $e'$ is a line-screw, and is provided with a stem. On or over said stem works the screw $f^4$, which is hollow. The screw $e'$ is journaled and supported in the frame $b$ and bracket or stop $b^4$, that is bolted to the side of the frame $b^3$, the bracket serving the double purpose of a support and stop for the screw $e'$ to prevent the screw from moving laterally. The stem of the screw $e'$, over which works the hollow screw $f^4$, passes through the frame $b$ to accommodate the hand-wheel $e$, by which the screw $e'$ is operated. The end of the hollow screw $f^4$ passes through the frame $b$, also to accommodate the hand-wheel $f$, that is provided with handles $f'$ for operating the hollow screw $f^4$ in opening and closing the clutch $c$. On the driving-shaft $a'$ there is arranged a sleeve, $h$, that is keyed on the shaft. The sleeve is provided with a feather, $o'$, on and over the sleeve $h$, and feather $o'$ works a sliding friction-cone, $g$, the periphery and face of which has arranged in it round perforations $p$, that are filled with plugs of any suitable materials thought to be best to create friction. The friction-cone $g$ has on the inner surface of its hub a channel or groove to accommodate the feather $o'$, over which the friction-cone slides, the feather $o'$ serving to keep the friction-cone $g$ fast for rotating purposes. The drum $d$, on its inner surface, is of conic form, and corresponds with the form of the cone $g$ on the friction side of the drum $d$. The clutch side of the drum $d$ is provided with openings $m'$ in the disk, corresponding in size and form with the teeth or lugs $m$ of the clutch $c$. On the connected shaft $a$ there is a loose collar, $i$, that serves to cover the key $i'$, that keys the drum $d$ to the shaft $a$.

My device operates as follows: When the parts are to be brought into engagement the hand-wheel $e$ is turned to the right, turning the screw $e'$, causing the screw-nut $f^2$ to travel to the right, carrying with it the fork end of the shifting-arm $j'$, that lies in the recesses of the screw-nut $f^2$, carrying with it the sliding friction-cone $g$ by means of the pins $n'$, that pass through the shifting-arm $j'$, and by this simple and easy method of turning the hand-wheel $e$ the friction-cone $g$ is carried in the drum $d$, causing the friction-plugs to impinge against the inner conic surface of the drum $d$, rotating the same by the friction thus created by the impingement of the surfaces. By turning the hand-wheel $f$ to the left the screw-nut $f^3$ is caused to travel on the hollow screw $f^4$, carrying with it the fork end of the shifting-arm $j$, the forks of which lie in the recesses formed in the screw-nut $f^3$, and by reason of the pins $n$, that pass through the arm $j$, move the clutch $c$ in the direction of the drum $d$, bringing the clutch $c$ and drum $d$ into engagement, all of the rotating parts having been set in motion by the friction-cone $g$ in the manner before stated. The teeth or lugs $m$ pass through the openings $m'$ in the drum $d$. The lugs $m$, that are formed as shown on their ends, present their foremost and longest parts, which enter openings $m'$, formed in the flange of the friction-wheel $g$, and find their bearings in the same, creating thereby positive or forced motion, without shock or jar to the frame. To disengage the engaging parts the turning of the wheels $e f$ is reversed.

In the hub of the friction-wheel $g$ there is formed a groove, $q$, Fig. 2, the object of which is to hold the escaping oil near for lubricating the ends of the shafts until the same, by centrifugal force, shall pass out through the oil-hole $t'$, formed in the flange of the wheel $g$. By this means the escaping oil is prevented from reaching the friction-cone $g$, which would, should the oil reach the same, prevent friction. When the parts are in engagement the collar $t$ enters the groove $q$, and thereby prevents the oil from escaping except through the oil-hole $t'$, as before stated.

Having described my newly-invented friction-clutch and its mode of operation, what I claim, and desire to secure by Letters Patent, is—

1. The combination of the drum $d$, friction-wheel $g$, collar $k'$, sleeve $h$, feather $o'$, pins $n'$, perforations P, shifting-arm $j'$, screw-nut $f^2$, screw $e'$, hand-wheel $e$, stop $b^4$, slot $j^2$, frame $b'$, frame $b^3$, frame $b$, and shaft $a'$, substantially as described, and for the purpose set forth.

2. The combination of the drum $d$, clutch $c$, lugs $m$, openings $m'$, collar K, pins $n$, shifting-arm $j$, screw-nut $f^3$, hollow screw $f^4$, screw $e'$, stop $b^4$, wheel $e$, wheel $f$, slot $j^2$, groove $q$, collar $t$, oil-hole $t'$, frame $b'$, frame $b$ $b^3$, and connected shaft $a$, substantially as described, and for the purpose set forth.

3. The combination of friction-wheel $g$ and the clutch C, when the same are in engagement, as and for the purpose set forth.

EDWARD WILKINSON.

Witnesses:
 KITTIE INGLIS,
 JOHN INGLIS.